United States Patent
Pilkington et al.

(10) Patent No.: US 6,681,006 B1
(45) Date of Patent: Jan. 20, 2004

(54) SERVICE ACTIVATION UPON AUTOMATIC CALLBACK AND AUTOMATIC RECALL EXPIRATION

(75) Inventors: Joanne Clare Pilkington, Brampton (CA); Sylvain Jodoin, Montreal (CA); Andre LeBon, Montreal (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/215,466

(22) Filed: Dec. 17, 1998

(51) Int. Cl.[7] .............................. H04M 1/64; H04M 3/42
(52) U.S. Cl. .............................. 379/210.01; 379/209.01; 379/67.1
(58) Field of Search ................................. 379/209, 355, 379/373–375

(56) References Cited

U.S. PATENT DOCUMENTS

| 3,707,605 | A |   | 12/1972 | Lee, Jr. et al. ............... 379/209 |
| 4,068,101 | A |   | 1/1978 | Chemarin .................... 379/229 |
| 4,166,929 | A | * | 9/1979 | Sheinbein .................... 379/207 |
| 4,932,042 | A |   | 6/1990 | Baral et al. ............... 379/88.24 |
| 5,661,790 | A | * | 8/1997 | Hsu ............................. 379/209 |
| 6,104,786 | A | * | 8/2000 | Gibilisco et al. ........ 379/88.23 |

OTHER PUBLICATIONS

Repeat Call feature, Bell Atlantic, Mar. 1989.*
LATA Switching Systems Generic Requirements (LSSGR), Automatic Callback, Technical Reference—TR–NWT–000215, Issue 3, Jun. 1993, pp. 25 to 27, 75, 84, 89, 91, 102 to 105.
The Yankee Group, Upgrading the CO: A Decongestant for Internet Blockage, vol. #12, Issue #2, Apr. 1997.

* cited by examiner

Primary Examiner—Ahmad F. Matar
Assistant Examiner—Hector Agdeppa

(57) ABSTRACT

The present invention addresses the current limitations of the automatic callback and automatic recall (AC/AR) features. Upon activation of AC/AR and subsequent timeout, the calling party receives ring back. Upon going off-hook, an announcement is played informing the calling party that the monitoring time has expired and that the call could not be completed during that time. The calling party is then offered service options including extending the monitoring time and message delivery.

12 Claims, 7 Drawing Sheets

SERVICE ACTIVATION UPON AUTOMATIC CALLBACK AND AUTOMATIC RECALL EXPIRATION

FIELD OF THE INVENTION

This invention relates to automatic callback and automatic recall and in particular to a method for service continuance upon expiration.

BACKGROUND OF THE INVENTION

In traditional plain old telephone service (POTS), an attempt by a subscriber to connect to a line already in use results in a busy signal. The subscriber has to wait and attempt to connect again later.

As defined in "Bellcore TR-NWT-000215 CLASS Feature: Automatic Callback, Issue 3, June 1993" (the contents of which are incorporated herein by reference), Automatic Callback "AC", which is requested by *66, is an outgoing call management feature that enables a customer encountering a busy station to perform an activation procedure and have call setup performed automatically when the called station becomes free.

As defined in "Bellcore TR-NWT-000227 CLASS Feature: Automatic Recall, Issue 3, July 1993" (the contents of which are incorporated herein by reference), Automatic Recall "AR", which is requested by *69, is an incoming call management feature that enables a customer to perform an activation procedure and automatically redial the last incoming number without having to know the number or even who the calling party was.

Once AC/AR is activated, a status (busy or free) of the terminating and originating lines is checked periodically until a call setup is attempted or a timeout occurs. Should a timeout occur, the AC/AR service is automatically deactivated and resources are cleared without the calling party being notified of its cancellation.

The Bellcore standards define timers T6 and T10. Timer T6 specifies the duration of the current AC/AR request. The value suggested by Bellcore is 30 minutes. Currently, a user may reactivate AC/AR before timer T6 has expired, in which case timer T6 is reset to its starting value. Timer T10, the sanity timer, guards against indefinite subscriber reactivations. It is initialized at the first AC/AR activation and is not reset at each reactivation. The Bellcore suggested value is three hours.

With growth of Internet and on-line services, a trend exists toward longer holding times thus a higher probability of calling a line that is busy for longer than 30 minutes. According to "Upgrading the CO: A Decongestant for Internet Blockage," Yankee Group Telecommunications White Paper, Volume 12, Issue 2, April 1997, average voice calls last three minutes and seldom more than 10 minutes. On the other hand, Internet calls average 18 minutes and a significant probability exists that they will last 40 minutes to several hours.

U.S. Pat. No. 5,707,605 issued Dec. 26, 1972 to Lee et al. discloses an automatic call-back system for automatic telephone exchanges. The system disclosed allows the calling party to make another call while call-back is in effect and was primarily designed for Private Branch Exchange systems.

U.S. Pat. No. 4,068,101 issued Jan. 10, 1978 to Chemarin allows for automatic communication establishment between two telephone subscribers of different exchanges. The identities of the calling party and the called party are transferred to the called exchange if the called line is busy, permitting disconnection of the two exchanges. The called's line is thereafter monitored until becoming free upon which the calling party's identity is utilized by the called party's exchange for calling back the calling party. In accordance with an aspect of U.S. Pat. No. 4,068,101 the monitoring of the called's line is maintained only for a pre-determined time period before the identities are annulled.

U.S. Pat. No. 4,932,042 issued Jun. 5, 1990 to Baral et al. relates to arrangements for providing a new spontaneous voice message service to any telephone customer at any telephone station when that customer encounters any destination that is busy or does not answer.

Current AC/AR features are limited in that the calling party is not notified when the AC/AR service times out. As well, some users may not be aware of the time limit, although an announcement may say that the monitoring is for 30 minutes. Some users, especially first time users, may not even think that AC/AR works because if the called line is busy longer than the time limit, no feedback is received. Due to this, people may only use AC once. A possibility also exists that a subscriber-may be notified that the once busy line is free, but by the time the subscriber picks up, the line is busy again. Therefore, circumstances may exist where the subscriber may pay for the feature without connecting or communicating with the called party either directly (e.g., person to person call) or indirectly (e.g., voice mail, pager, E-mail, etc.).

SUMMARY OF THE INVENTION

The method of the subject invention permits a user of an Automatic Callback or Automatic Recall service to receive an indication of the completion of a monitoring time. Upon being notified, the user may choose to continue monitoring for another time period, stop monitoring, send a voice mail or activate another service.

In accordance with an aspect of the present invention there is provided a method for handling automatic calling comprising: monitoring a terminating line; during said monitoring, automatically attempting call set-up when an originating line and said terminating line become free; if said call has not been completed during a pre-determined time, attempting to notify on said originating line.

In accordance with a further aspect of the present invention there is provided a method for activating a service related to automatic call handling, said automatic call handling for monitoring a terminating line and automatically attempting call setup when an originating line and said terminating line become free, said method comprising: if said call setup has not been completed upon expiration of a pre-determined time, attempting to notify on said originating line; during said attempting to notify step, if said originating line goes off-hook, undertaking the following steps: providing a user of said originating line with a plurality of service options; receiving an indication of a preferred one of said plurality of service options from said user; and responsive to said indication, activating said preferred service.

In accordance with a still further aspect of the present invention there is provided a computer readable medium containing computer-executable instructions which, when performed by a processor in a communications system, cause the processor to: monitor a terminating line; automatically attempt call set-up when an originating line and the terminating line become free during the monitoring; and attempt to notify on the originating line if the call has not been completed during a pre-determined time.

In accordance with another aspect of the present invention there is provided a communications system comprising: a terminating telephone line; a terminating office; an originating telephone line; an originating office including a processor operable to: monitor said terminating line; during said monitoring, automatically attempt call set-up when said originating line and said terminating line become free; if said call has not been completed during a pre-determined time, attempt to notify on said originating line.

In accordance with another aspect of the present invention there is provided a communications system comprising: an originating telephone line; an originating office; terminating telephone line; a terminating office including a processor operable to: monitor said terminating line; during said monitoring, this is done by the originating office; only the monitoring is done by the terminating office.

BRIEF DESCRIPTION OF THE DRAWINGS

In the figures which illustrate an example embodiment of this invention.

DETAILED DESCRIPTION OF THE PREFERRED EMBODIMENTS

Overall, the invention addresses the current limitations of the AC/AR features. More precisely, upon expiry of the monitoring time, the calling party is notified and offered the following choices: to activate AC/AR again, to send a message to the called party, or to hang up (do nothing). Note that regardless of whether the called party is a voice mail subscriber, the messaging is handled by another message delivery system.

Figure 1:
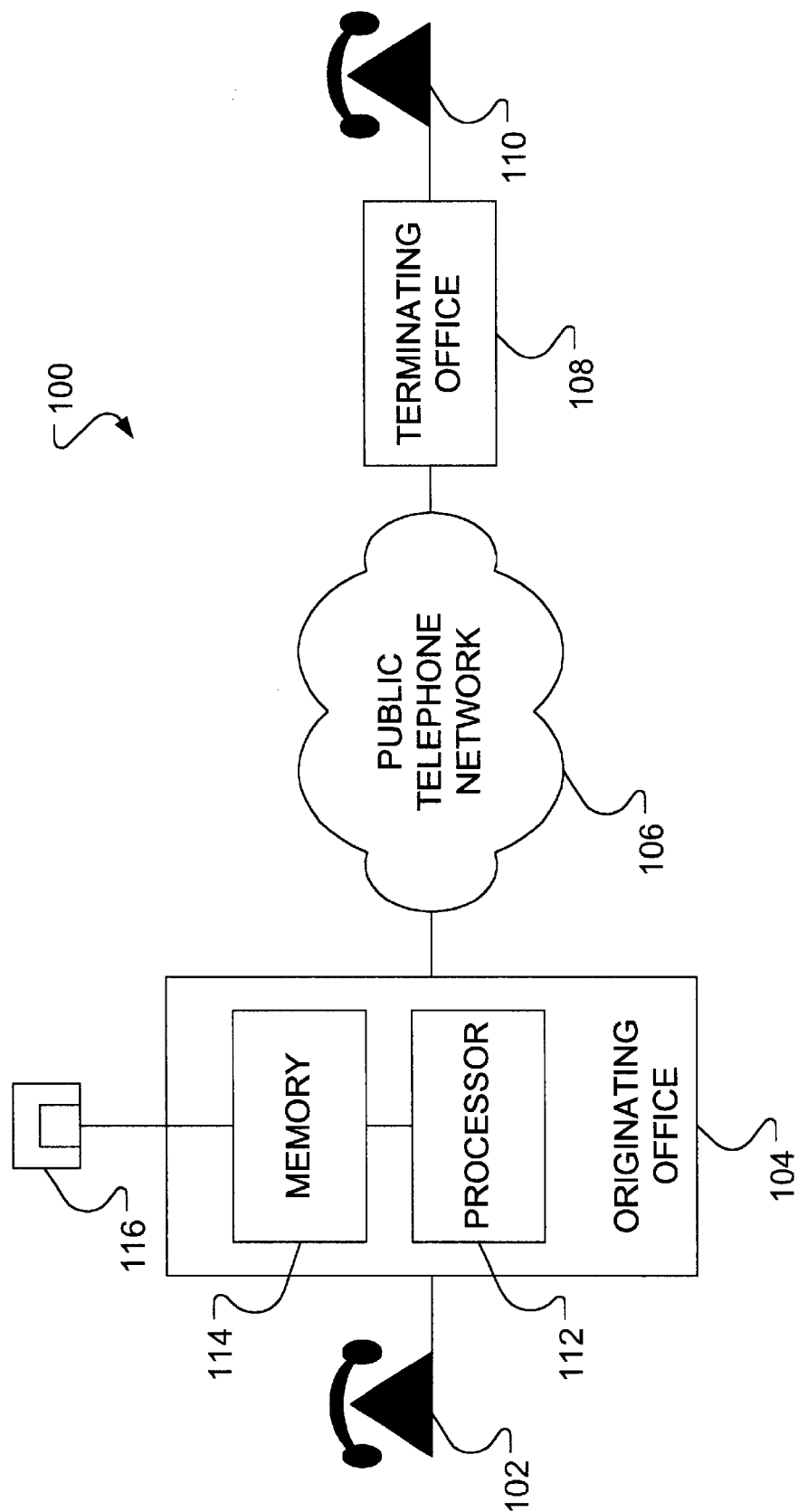
FIG. 1 is a schematic diagram of a calling telephone apparatus connected over a public telephone network to a called telephone apparatus.

Referencing FIG. 1, which schematically illustrates a communication system 100, a calling telephone station apparatus 102 is connected to a public telephone network 106 through an originating office 104. A called telephone station apparatus 110 is connected to public telephone network 106 through a terminating office 108. Originating office 104 comprises a processor 112 and a memory 114 loaded with AC/AR software for executing the method of this invention from software medium 116 which could be a disk, a tape, a chip or a random access memory containing a file downloaded from a remote source.

Upon activation of AC/AR and a called station busy status received from terminating office 108, a "Delayed Processing" procedure is performed. This standard procedure is described in detail in "Bellcore TR-NWT-000215 CLASS Feature: Automatic Callback, Issue 3, June 1993" and "Bellcore TR-NWT-000227 CLASS Feature: Automatic Recall, Issue 3, July 1993". As part of the Delayed Processing procedure a query is sent requesting that terminating office 108 monitor the terminating line and inform originating office 104 when it becomes idle. This monitoring is termed "scanning".

Figure 2:
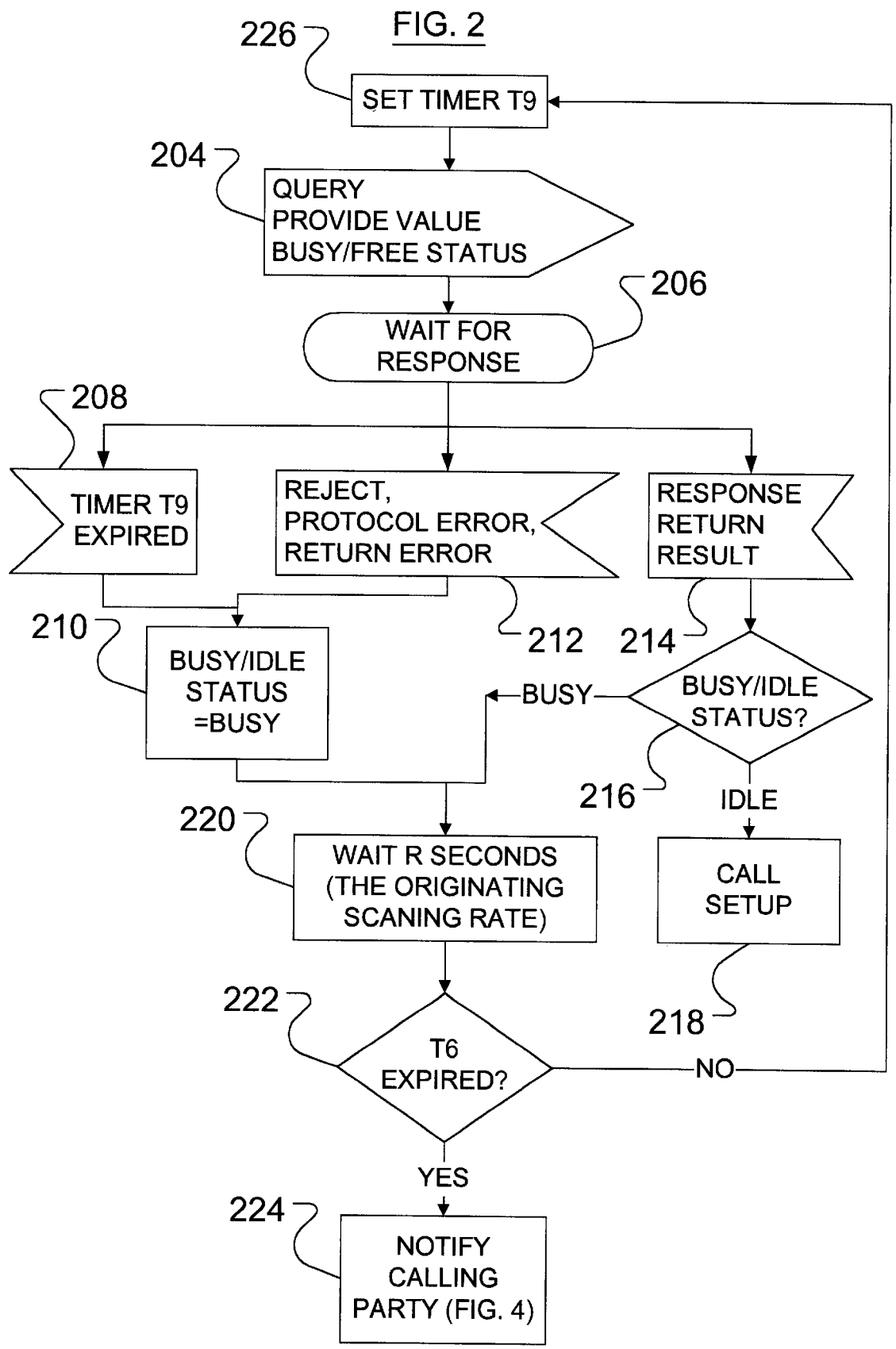
FIG. 2 illustrates, in a flow diagram, a procedure, performed by an originating office when an originating office is responsible for monitoring a called line for busy/idle status, employing an embodiment of the invention.
Figure 3:
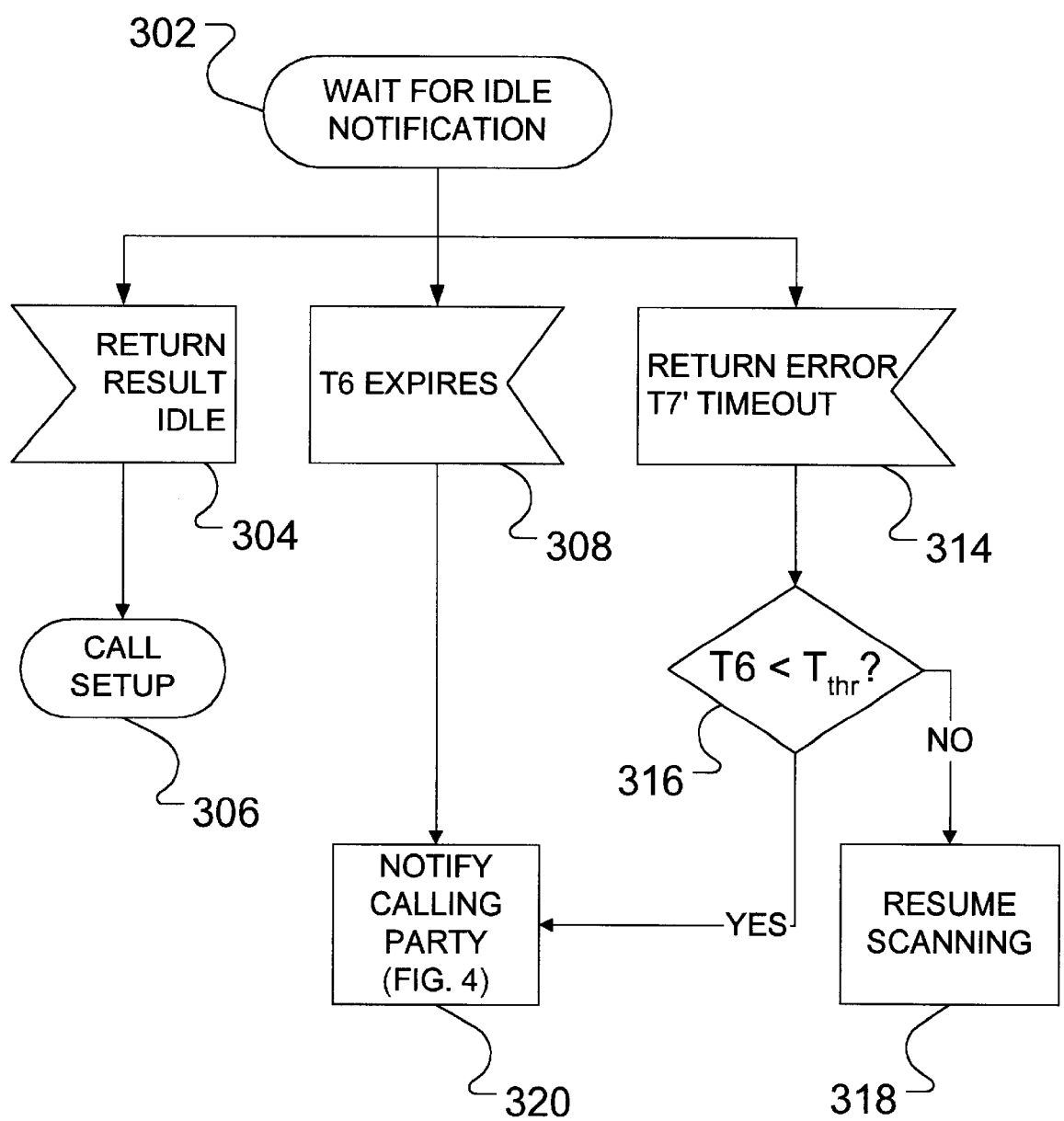
FIG. 3 illustrates, in a flow diagram, a procedure, performed by an originating office when a terminating office is responsible for monitoring a called line for busy/idle status, employing an embodiment of the invention.

If terminating office 108 is capable of returning busy/idle status information but cannot control the scanning process, an "Originating Scanning" procedure is initiated. The Originating Scanning procedure from the viewpoint of the originating office is presented in FIG. 3–8 of "Bellcore TR-NWT-000215 CLASS Feature: Automatic Callback, Issue 3, June 1993" and FIG. 3–8 of "Bellcore TR-NWT-000227 CLASS Feature: Automatic Recall, Issue 3, July 1993". In accordance with the present invention, the Originating Scanning procedure may be modified to that shown in FIG. 2. The conventional steps include the following. A query message is sent to terminating office 108 requesting the busy/idle of the terminating line (step 204). A response is awaited (step 206). If a timer T9 expires (step 208) or a rejection or error is returned from terminating office 108 (step 212), the status is reported as "busy" (step 210). The status of busy or free is determined (step 216). If a response to the query is received (step 214), if the status is free, program control is returned to the Delayed Processing procedure to attempt call setup (step 218). If the status is busy, there is a wait for a pre-determined time (step 220), i.e., the originating scanning rate, then a determination is made whether timer T6 has expired (step 222). If timer T6 has not expired, timer T9 (step 226) is set and the procedure begins again with another query. Timer T9 is called the "Subsequent Query Response Timer" and specifies a limit to the amount of time the originating office will wait for a response from the terminating office to any query other than the initial query.

In accordance with this invention, upon expiry of timer T6, the calling party is notified (step 224). A Notify Calling Party process takes the place of a Deactivation Procedure of the conventional Originating Scanning procedure. The Deactivation Procedure is a standard Bellcore procedure.

If terminating office 108 is capable of performing the called party busy/idle scanning function, a "Terminating Scanning" procedure is initiated. The Terminating Scanning procedure from the viewpoint of the originating office is presented in FIG. 3–12 of "Bellcore TR-NWT-000215 CLASS Feature: Automatic Callback, Issue 3, June 1993" and FIG. 3–12 of "Bellcore TR-NWT-000227 CLASS Feature: Automatic Recall, Issue 3, July 1993". In accordance with this invention the Terminating Scanning procedure may be modified to that shown in FIG. 3. The conventional steps of the procedure include the following. There is a wait for notification that the terminating line is idle (step 302). If the terminating line becomes idle the "idle" result is returned to the originating office 104 (step 304). Program control is then passed back to the Delayed Processing procedure to attempt call setup (step 306). If a timer, known as Terminating Scanning Monitoring Timer or "T7'", expires before the terminating line becomes idle (step 314), it is determined whether timer T6 is less than a Resume Scanning Threshold $T_{thr}$ (step 316). Timer T7' determines the length of time that the terminating switch will perform terminating scanning for an AR/AC attempt. The Resume Scanning Threshold is a parameter that may be set by a telephone company and is used by the originating office to determine if scanning should be resumed. If timer T6 is greater than threshold $T_{thr}$, scanning is continued (step 318).

In accordance with this invention, if timer T6 expires before the terminating line becomes idle (step 308), the calling party is notified (step 320). In another case, if, upon expiry of timer T7', timer T6 is less than threshold $T_{thr}$, the calling party is notified (step 320). The notify calling party process of step 320 replaces the Deactivation Procedure of the conventional Terminating Scanning procedure.

Figure 4:
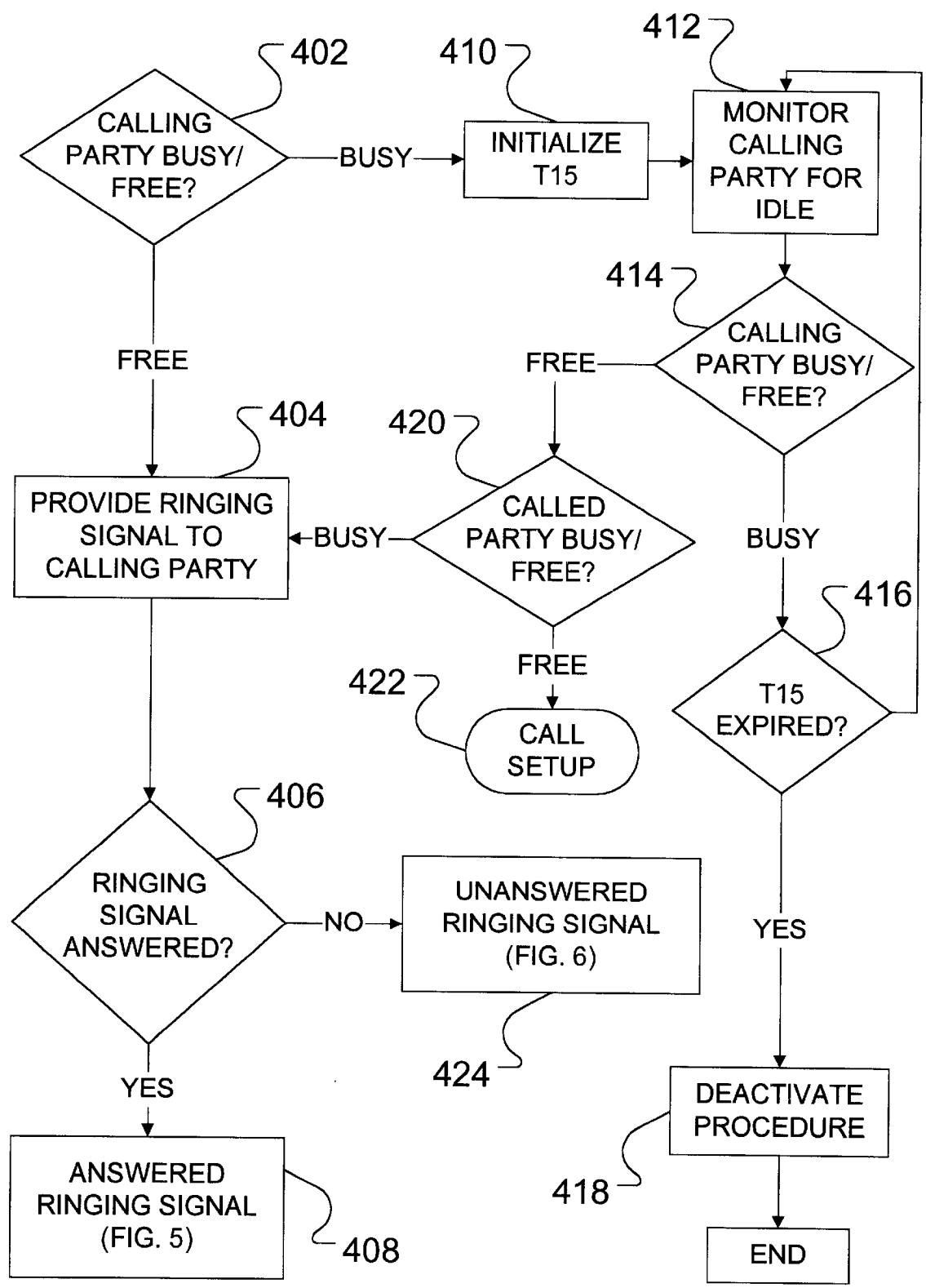
FIG. 4 illustrates, in a flow diagram, the steps of a calling party notification procedure in an embodiment of the invention.

FIG. 4 illustrates the steps involved in the notification of a calling party of the continued unavailability of a called party's line. If the originating line is determined to be free when a timeout occurs (step 402), a ringing signal is applied to the terminating line (step 404). If calling telephone station apparatus 102 is answered (step 406), an Answered Ringing Signal procedure is followed (step 408). If calling telephone station apparatus 102 is not answered, an Unanswered Ringing Signal procedure is followed (step 424).

If the originating line is determined to be busy when a timeout occurs (step 402), a timer T15 is initialized (step 410). Timer T15, which is a new timer in accordance with this invention, specifies the duration of the monitoring of the calling party's line for an idle condition after an AC/AR request has expired. The originating line is then monitored for idle status (step 412). If the originating line continues to be busy (step 414) when it is determined that T15 has expired (step 416) before the originating line has become free, the Deactivation Procedure is performed (step 418) and the service is disabled. If the originating line becomes free (step 414) while being monitored, the called line status is reevaluated (step 420). If the called line is free, program control is passed back to the Delayed Processing procedure to attempt call setup (step 422). If the called line is busy, a ringing signal is applied to the originating line (step 404).

Figure 5:
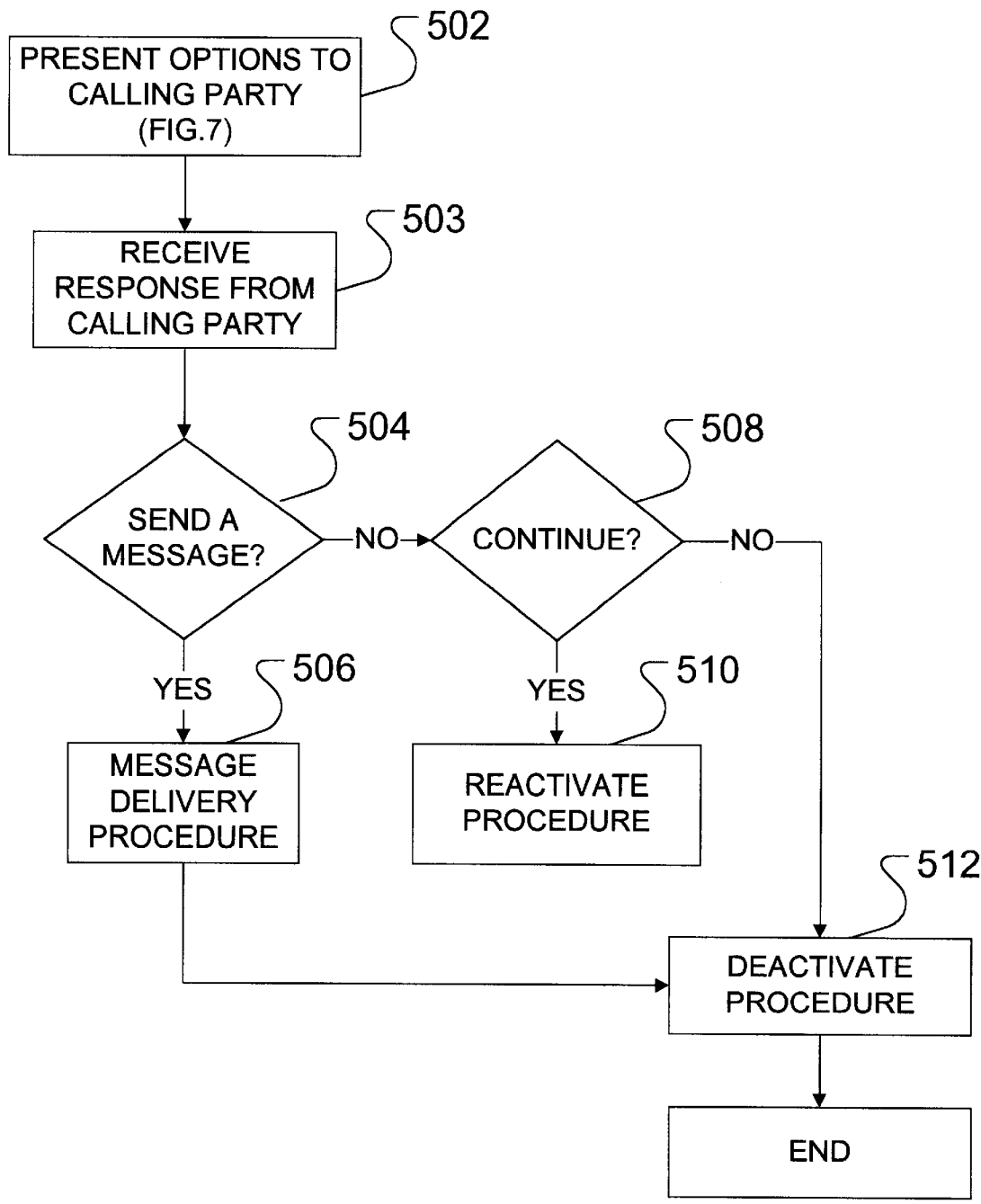
FIG. 5 illustrates, in a flow diagram, the steps resulting from an answered ringing signal in an embodiment of the invention.

Turning to FIG. 5, the steps undertaken when the calling party answers in response to a ringing signal generated on a timeout begin with an announcement informing the calling party that the monitoring time has expired and that the call could not be completed during this monitoring time. The calling party is then offered service options (step 502). Referencing FIG. 7, these options depend on whether the ringing signal was performed as a result of a monitoring timer (e.g., T6 or T7') timeout, or overall timer T10 timeout (step 702). Options may include extension of the monitoring time and message delivery. The following is an example of the announcement the calling party could hear when a monitoring timer expires: "The line you are monitoring is still busy. To continue monitoring the line for the next 30 minutes at no additional charge press * now; to send a message for 50 cents press 2 now; or to do nothing hang up now." (step 704). When an overall timer expires, the following message may be heard: "The line you are monitoring has been busy for three hours. To continue monitoring for the next 30 minutes for 50 cents press * now; to send a message for 50 cents press 2 now; or to do nothing hang up now." (step 708). Returning to FIG. 5, the response of the calling party is received (step 503). If the calling party opts to send a message (step 504), program control is passed to a procedure or an off-board processor to record a message and ensure delivery to the called party (step 506), the Deactivation Procedure is then performed (step 512) disabling the service. If the calling party opts to continue monitoring the terminating line (step 508), a Reactivation Procedure is performed (step 510). If the calling party opts to do nothing, the Deactivation Procedure is performed (step 512) disabling the service.

Figure 6:
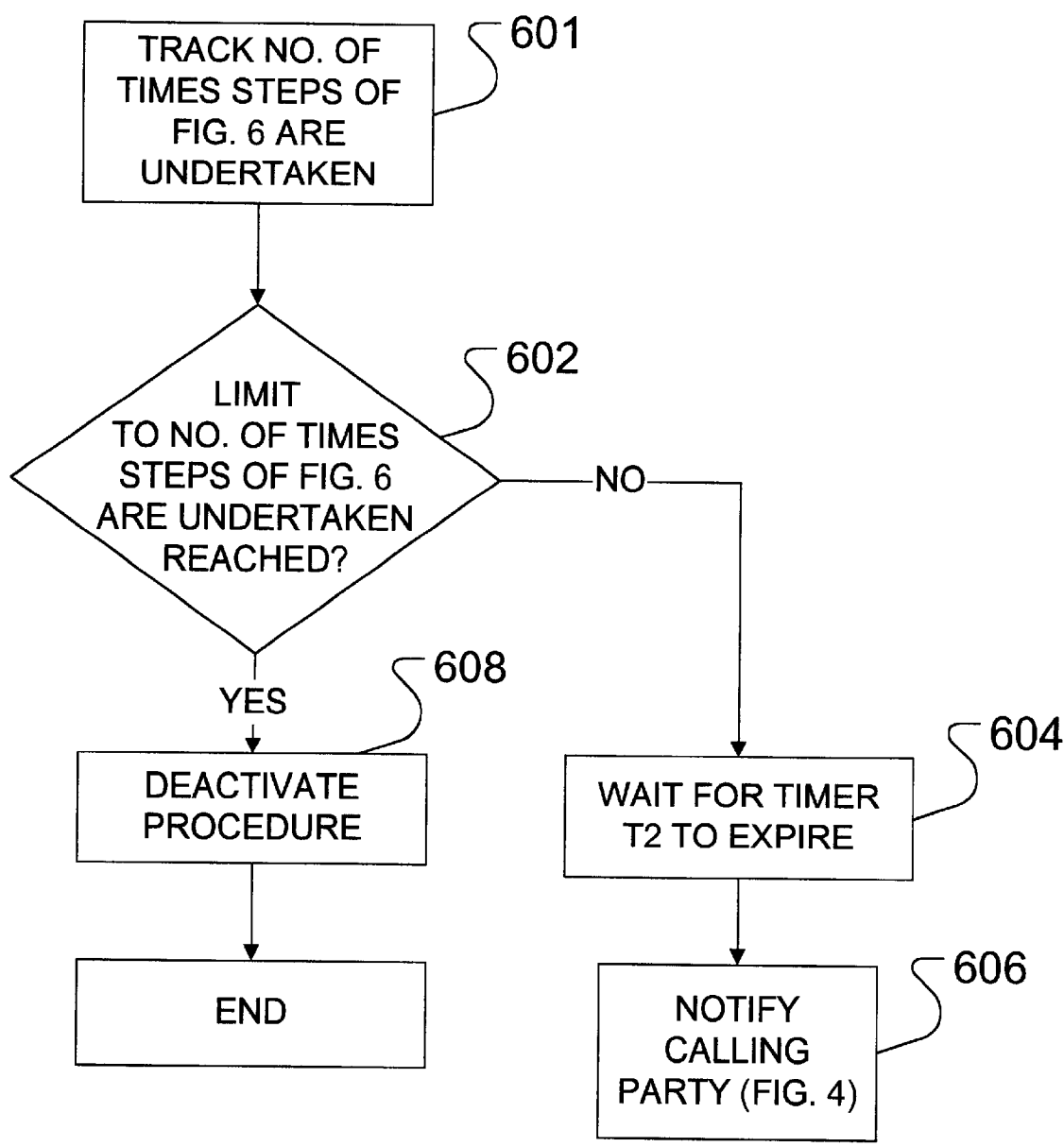
FIG. 6 illustrates, in a flow diagram, the steps resulting from an unanswered ringing signal in an embodiment of the invention.
Figure 7:
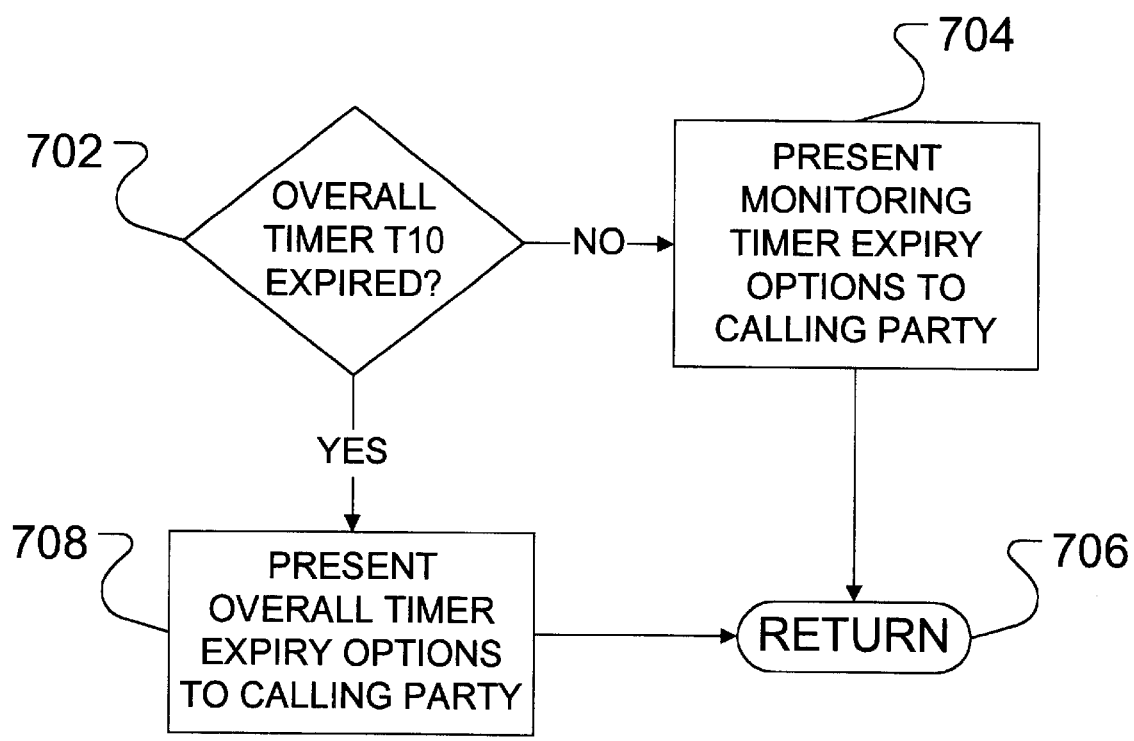
FIG. 7 illustrates, in a flow diagram, the steps involved in determining which options to present to a calling party in an embodiment of the invention.

If the calling party fails to answer in response to a pre-determined number of applications of the ringing signal generated on a timeout, the steps of FIG. 6 are undertaken. The number of times that the steps of FIG. 6 are undertaken in a single scanning session is tracked (step 601) and a determination is made regarding whether the number of times has reached a limit (step 602). If the limit has not been reached, the process waits for a timer T2 to expire (step 604) before returning to the beginning of the Notify Calling Party process of FIG. 4 (step 606). Resume Scanning Timer, T2, specifies the amount of time that the originating switch waits to resume scanning after the calling party does not answer the ringing signal. Timer T2 expires after an amount of time set by a telephone company employing the AC/AR feature. If the maximum number of permissible times the steps of FIG. 6 may be undertaken has been reached, the Deactivation procedure is performed (step 608) disabling the service.

Regarding the ringing signal applied to the originating line when an AC/AR timeout occurs, the same ringing signal applied when a call setup is attempted may be used, e.g., two short rings and one long ring in six seconds. Occasionally, the provision of a ringing signal upon expiration of an AC/AR timer that is different from the ringing applied when a call setup is attempted may be desired. However, the availability of special distinctive rings may be limited due to their use with other features.

Some subscribers may not want to be notified when the timeout occurs, i.e., they prefer the current behaviour of AC/AR. Therefore, if this AC/AR enhancement feature is turned on office wide, an option to deny the enhanced functionality for individual lines may exist. This may be accomplished easily with a line option or a specific field in the existing AC/AR option.

Those telephone companies that do not currently offer a message delivery service could simply provide the option to extend the monitoring time.

It will be appreciated by a person skilled in the art the service options may also include sending a page, sending an E-mail, resuming the monitor after an hour wait and others.

Other modifications will be apparent to those skilled in the art and, therefore, the invention is defined in the claims.

We claim:

1. A method for handling automatic calling comprising:
   monitoring a terminating line;
   during said monitoring, automatically attempting call set-up when an originating line and said terminating line become free;
   if said call has not been completed during a pre-determined time, attempting to notify on said originating line; and
   during said attempting to notify step, if said originating line goes off-hook, providing a user of said originating line with a plurality of service options.

2. The method of claim 1 wherein said attempting to notify comprises applying a distinctive ringing signal on said originating line when said originating line is on-hook.

3. The method of claim 1 wherein said attempting to notify comprises applying a ringing signal a pre-determined number of times to said originating line when said originating line is on-hook and, upon said originating line going into an off-hook state, providing an indication said call has not been completed during said pre-determined time.

4. The method of claim 3 further comprising receiving a request for a time extension for monitoring over said off-hook originating line and, in response, continuing to monitor said terminating line and, during said continued monitoring, automatically attempting call set-up when said originating line and said terminating line become free.

5. The method of claim 3 further comprising, after said originating line going into an off-hook state, receiving a request to send a message over said off-hook originating line;

arranging, responsive to said receiving, that a message be recorded over said originating line and delivered; and ceasing to monitor.

6. The method of claim 3 wherein said applying a ringing signal to said originating line when on-hook comprises, if said originating line is off-hook, checking said originating line for another pre-determined time until said originating line goes on-hook.

7. The method of claim 6 wherein if said originating line remains on-hook following said applying step, waiting, then repeating said applying step.

8. The method of claim 6 including, if said another pre-determined time is exceeded, ceasing to monitor.

9. The method of claim 7 including, if a number of repetitions of said applying step exceeds a limit, ceasing to monitor.

10. A method for activating a service related to automatic call handling, said automatic call handling for monitoring a terminating line and automatically attempting call setup when an originating line and said terminating line become free, said method comprising:

if said call setup has not been completed upon expiration of a pre-determined time, attempting to notify on said originating line;

during said attempting to notify step, if said originating line goes off-hook, undertaking the following steps:

providing a user of said originating line with a plurality of service options;

receiving an indication of a preferred one of said plurality of service options from said user; and responsive to said indication, activating said preferred service.

11. A computer readable medium containing computer-executable instructions which, when performed by a processor in a communications system, cause the processor to:

monitor a terminating line;

automatically attempt call set-up when an originating line and said terminating line become free during said monitoring; and attempt to notify on said originating line if said call has not been completed during a pre-determined time, and during said attempting to notify step, if said originating line goes off-hook, providing a user of said originating line with a plurality of service options.

12. A communications system comprising:

a terminating telephone line;

a terminating office;

an originating telephone line;

an originating office including a processor operable to:

monitor said terminating line;

during said monitoring, automatically attempt call set-up when said originating line and said terminating line become free;

if said call has not been completed during a pre-determined time, attempt to notify on said originating line; and during said attempting to notify step, if said originating line goes off-hook, providing a user of said originating line with a plurality of service options.

* * * * *

UNITED STATES PATENT AND TRADEMARK OFFICE
CERTIFICATE OF CORRECTION

PATENT NO. : 6,681,006 B1  
DATED : January 20, 2004  
INVENTOR(S) : Joanne Clare Pilkington, Sylvain Jodoin and Andre LeBon It is certified that error appears in the above-identified patent and that said Letters Patent is hereby corrected as shown below:

Column 4,
Lines 27 to 29, cancel "The status of busy or free is determined (step 216). If a response to the query is received (step 214), if" and insert -- If a response to the query is received (step 214), the status of busy or free is determined (step 216). If --.

Column 8,
Line 13, cancel "pre-determined time," and insert -- pre-determined time; --.

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,681,006 B1
DATED        : January 20, 2004
INVENTOR(S)  : Joanne Clare Pilkington, Sylvain Jodoin and Andre LeBon It is certified that error appears in the above-identified patent and that said Letters Patent is hereby corrected as shown below:

Column 3,
Lines 10-16, cancel the paragraph "In accordance with...is done by the terminating office."

Signed and Sealed this

Twenty-first Day of September, 2004

JON W. DUDAS
*Director of the United States Patent and Trademark Office*